(12) United States Patent
Buchner et al.

(10) Patent No.: US 9,986,296 B2
(45) Date of Patent: May 29, 2018

(54) INTERACTION WITH MULTIPLE CONNECTED DEVICES

(71) Applicant: Yahoo! Inc., Sunnyvale, CA (US)

(72) Inventors: Karolina Buchner, San Jose, CA (US); Roman Lissermann, San Francisco, CA (US); Lars Erik Holmquist, San Francisco, CA (US)

(73) Assignee: Oath Inc., New York, NY (US)

( * ) Notice: Subject to any disclaimer, the term of this patent is extended or adjusted under 35 U.S.C. 154(b) by 0 days. days.

(21) Appl. No.: 14/338,328

(22) Filed: Jul. 22, 2014

(65) Prior Publication Data

US 2015/0195620 A1 Jul. 9, 2015

Related U.S. Application Data

(60) Provisional application No. 61/924,704, filed on Jan. 7, 2014.

(51) Int. Cl.
| | |
|---|---|
| *H04N 7/18* | (2006.01) |
| *H04N 21/4788* | (2011.01) |
| *H04N 21/41* | (2011.01) |
| *H04N 21/441* | (2011.01) |
| *H04N 21/81* | (2011.01) |

(52) U.S. Cl.
CPC ..... *H04N 21/4788* (2013.01); *H04N 21/4122* (2013.01); *H04N 21/4126* (2013.01); *H04N 21/441* (2013.01); *H04N 21/8126* (2013.01)

(58) Field of Classification Search
USPC .................................................. 725/74–85
See application file for complete search history.

(56) References Cited

U.S. PATENT DOCUMENTS

| | | | | |
|---|---|---|---|---|
| 8,627,385 | B2* | 1/2014 | Davies | H04N 5/4403 |
| | | | | 725/141 |
| 8,640,175 | B2* | 1/2014 | Ko | 725/80 |
| 8,643,736 | B2* | 2/2014 | Chu | H04L 67/2823 |
| | | | | 348/142 |
| 8,843,825 | B1* | 9/2014 | Whitman | G06F 17/30056 |
| | | | | 715/730 |
| 2003/0079224 | A1* | 4/2003 | Komar | H04N 5/44591 |
| | | | | 725/32 |
| 2007/0093275 | A1* | 4/2007 | Bloebaum et al. | 455/566 |
| 2007/0214426 | A1* | 9/2007 | Ruelle | G06F 3/0481 |
| | | | | 715/767 |

(Continued)

*Primary Examiner* — Mushfikh Alam
(74) *Attorney, Agent, or Firm* — Martine Penilla Group, LLP

(57) ABSTRACT

Methods and systems for sharing content includes detecting a secondary device that is paired to a main device. The main device is used to render publicly viewable content. Each secondary device is associated with a user and is used to access and view content provided by one or more content sources over a network and share the content with the main device and with other secondary devices. Selection of a multimedia content for sharing, is detected at the secondary device. The selection causes the rendering of the multimedia content at a display screen of the secondary device. Share attributes defined for the multimedia content selected for sharing, is identified on the secondary device. The multimedia content selected for sharing is populated and is available for viewing on the main device and/or one or more secondary devices of other users in accordance to the defined share attributes.

18 Claims, 7 Drawing Sheets

(56) References Cited

U.S. PATENT DOCUMENTS

| | | | |
|---|---|---|---|
| 2009/0271820 A1* | 10/2009 | Choi | H04N 7/17309 725/37 |
| 2009/0328122 A1* | 12/2009 | Amento et al. | 725/114 |
| 2010/0226288 A1* | 9/2010 | Scott et al. | 370/260 |
| 2011/0023073 A1* | 1/2011 | McCarthy | G06Q 20/123 725/98 |
| 2011/0209177 A1* | 8/2011 | Sela | H04N 7/17318 725/39 |
| 2011/0219420 A1* | 9/2011 | Raveendran et al. | 725/116 |
| 2012/0079080 A1* | 3/2012 | Pishevar | 709/220 |
| 2012/0159472 A1* | 6/2012 | Hong | H04L 12/1813 717/178 |
| 2012/0324076 A1* | 12/2012 | Zerr et al. | 709/223 |
| 2013/0139200 A1* | 5/2013 | Mountain | 725/41 |
| 2013/0198776 A1* | 8/2013 | Brockmann | H04N 21/4126 725/37 |
| 2013/0246946 A1* | 9/2013 | Iwasaki | G06F 3/048 715/761 |
| 2013/0305296 A1* | 11/2013 | Hashimura et al. | 725/74 |
| 2014/0007170 A1* | 1/2014 | Klappert et al. | 725/97 |
| 2014/0208384 A1* | 7/2014 | Youssefian | H04L 63/0869 726/3 |
| 2014/0282677 A1* | 9/2014 | Mantell | H04N 21/4722 725/23 |
| 2014/0282712 A1* | 9/2014 | Unnikrishnan | H04N 21/4788 725/34 |
| 2014/0310728 A1* | 10/2014 | Fang | G06F 9/54 719/328 |
| 2014/0325561 A1* | 10/2014 | Allen | H04N 21/2393 725/38 |
| 2014/0344721 A1* | 11/2014 | Prakash | H04M 1/274508 715/753 |
| 2015/0100998 A1* | 4/2015 | Pino, Jr. | H04N 21/8586 725/112 |
| 2015/0180943 A1* | 6/2015 | Cradick | G06F 3/016 715/747 |
| 2015/0304699 A1* | 10/2015 | Mehta | H04N 21/2343 725/62 |

\* cited by examiner

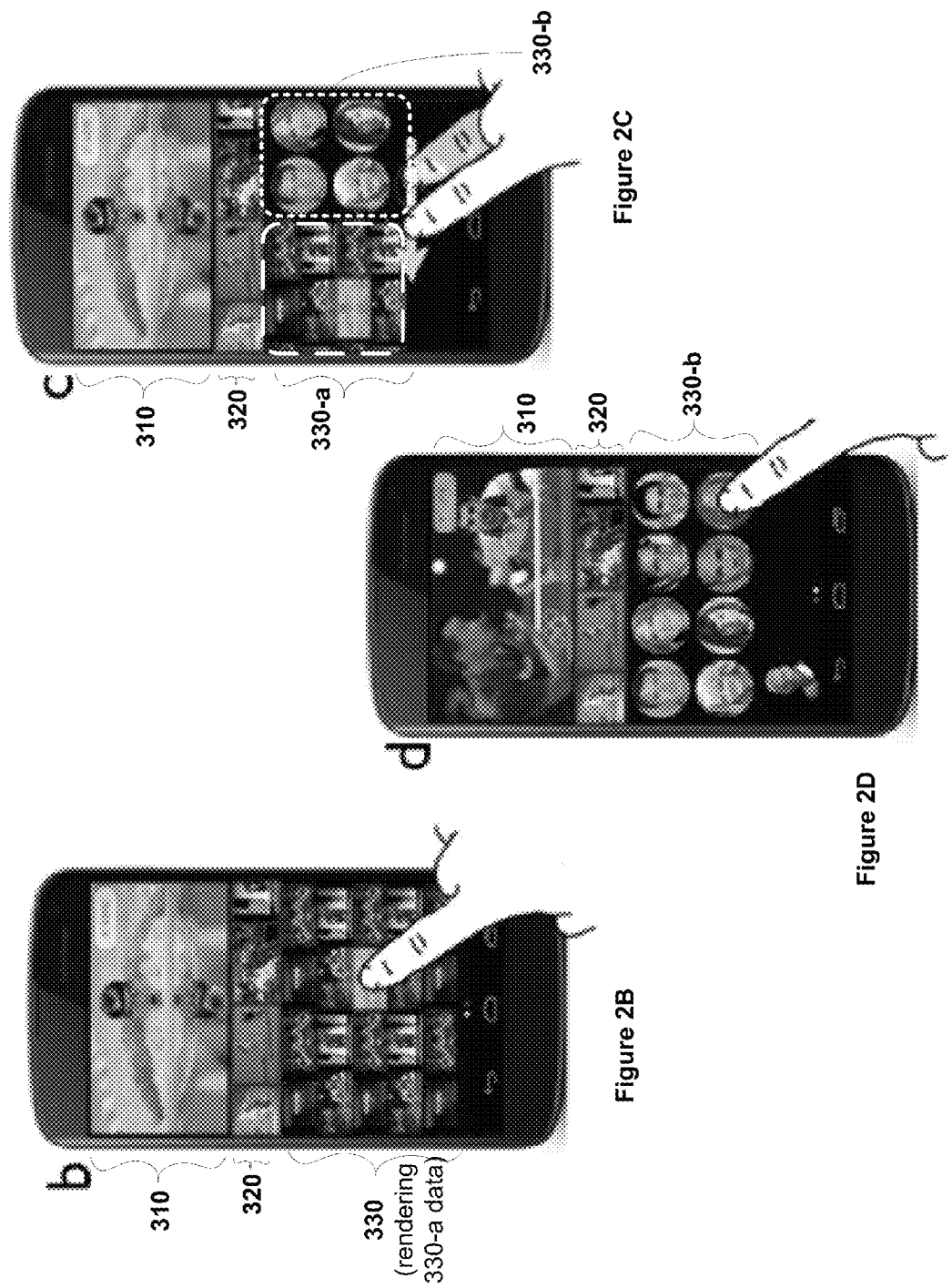

INTERACTION WITH MULTIPLE CONNECTED DEVICES

CLAIM OF PRIORITY

This application claims benefit of and priority, under 35 USC 119(e), to U.S. Provisional Patent Application No. 61/924,704, filed on Jan. 7, 2014, and entitled "Interaction With Multiple Connected Devices," which is herein incorporated by reference in its entirety.

BACKGROUND

Field of the Invention

The invention relates generally to ways to share content, more particularly, to sharing media content across television and a plurality of mobile devices.

Description of the Related Art

Television has been around for a number of years. However, television watching has evolved over the years. Watching television is a highly social experience with people physically gathering around the television for viewing major televised event, news, etc. Increasing number of users are bringing their mobile devices with them when gathering around to watch the television. Oftentimes, these users use their mobile devices while watching television, to consume content, which may or may not be related to the program being viewed by the group that is gathered together, to check email or social media updates, thereby shifting their attention away from the television. Such shift in attention by some users would cause other user(s) to have alone experiences even when these users are in the same room.

In other cases, users who traditionally have physically come together for viewing major events may not be able to do so due to social or professional commitment of some of the participating users. Additionally, a lot of content relating to the program being watched, exists on the Internet that is professionally curated or user generated and it would be advantageous to be able to view such content simultaneously while watching the program to enhance a user's TV viewing experience. It would advantageous to find ways to get the users that are co-located to enjoy watching the television together and for users that are not co-located, to bring the users virtually together to enable the non-co-located users share their television watching together, so as to keep their television (TV) watching traditions alive while enriching their TV watching experience.

Conventional TV allowed a user to watch one event at any given time. Later enhancements to the TV allowed users to watch more than one channel by engaging picture-in-picture capability built into the television. However, such capabilities compromise the TV viewing experience of some users (those that are able to watch the show in a smaller portion of the TV screen) while enhancing the viewing experience of other users (those that are able to watch the event in the main portion of the TV screen). It would be advantageous to allow the users to be able to control the content rendering on the main portion and be able to swap the content with other event content or to allow the users to curate the content for watching together.

It is in this context that the embodiments of the invention arise.

SUMMARY

Embodiments of the disclosure provide ways for users to share multimedia content with other users. An application provides the programming logic to detect mobile devices that are paired to a television and to provide an interface that allows users to consume and share television content with each other. The application also allows users to share television content, social media content and/or other content with a select subset of users through their mobile devices privately or publicly, while watching the television content publicly with other users. The select subset of users may be either co-located or remotely located. The content that can be shared privately or publicly may include live video streams (synchronously), web video (asynchronously), web content (for e.g., news articles, images, etc.), social media streams (individual content or streams of contents), etc. The various embodiments provide an interface to bring social awareness of what users are watching after they have shared the content. The application also provides ways for the users to detect what content other users are watching in a remote location and to enable viewing of such content when the remotely located users share the content with other users. The various embodiments that will be described herein provide the ability for the users to have a collaborative TV or other content viewing experience while also giving the ability to view some of the content privately. Thus, the embodiments provide the ability to connect different living rooms across geography making this a robust and collaborative virtual television viewing.

The various embodiments discussed herein provide a collaboration application tool that allows users to easily switch between collaborative watching and private watching. The application tool allows users to explore watching TV in a social setting by allowing users to easily share content amongst fellow viewers and between the TV and their mobile devices. The application tool allows users to consume content privately on their secondary devices, such as their mobile devices, but also bring them together for social experience by providing awareness of which users are viewing what content and providing affordances for sharing between users. The application tool provides the ability to watch different events (news, sports events, movies, etc., simultaneously on different devices) or different portions of a specific event that is being broadcast simultaneously (for e.g., Olympic event) without being tied to synchronized viewing of one event among all devices. The application tool interacts with a server to render shared multimedia content and coordinate sharing between devices, users and the TV. The application tool interfaces with the server to track which pieces of content are being viewed privately on the mobile devices, what content has been shared between users and to the TV and by whom, as well as the offsets into the multimedia content to keep viewing in synchronization between devices and the TV.

It should be appreciated that the present embodiments can be implemented in numerous ways, such as a process, an apparatus, a system, a device, or a method on a computer readable medium. Several embodiments are described below.

In one embodiment, the present invention provides a method for sharing multimedia content with other users. The method includes detecting a secondary device that is paired to a main device. The main device is used to render publicly viewable content. Each secondary device is associated with a user and is used to access and view content provided by one or more content sources over a network, including social media sources, and share the content with the main device and with other secondary devices. Selection of a multimedia content for sharing, is detected at the secondary device. The selection causes the rendering of the multimedia content at a display screen of the secondary device. Share attributes defined for the multimedia content selected for sharing, is identified on the secondary device. The multimedia content selected for sharing is populated on the main device and/or one or more secondary devices of other users in accordance to the defined share attributes. The selected multimedia content is available for viewing on one or more of the secondary devices and/or the main device.

In one embodiment, the publicly viewable multimedia content at the main device includes any one or combination of content provided by one or more content providers or content generated and shared by one or more users.

In one embodiment, the share attributes identify private sharing of the multimedia content.

In one embodiment, populating the selected multimedia content includes populating the one or more secondary devices associated with the one or more of the other users identified in the share attributes.

In one embodiment, the share attributes identify public sharing of the multimedia content.

In one embodiment, populating the selected multimedia content includes populating the main device of the one or more other users.

In one embodiment, populating includes presenting the selected multimedia content as a thumbnail.

In one embodiment, populating includes presenting the selected multimedia content on a display screen of the one or more secondary devices.

In one embodiment, the share attributes include social contact information of other users selected from one or more social graphs of a user initiating the sharing, the social contact information used in populating appropriate main and/or secondary devices of the other users.

In one embodiment, the share attributes include an icon of the user sharing the multimedia content, the icon being rendered alongside the selected multimedia content during sharing.

In one embodiment, populating includes providing an option to render the selected multimedia content on a full screen of a display screen of the main device and/or the secondary device.

In one embodiment, an option is provided to un-share a multimedia content that is shared on the main device.

In one embodiment, auxiliary content for the selected multimedia content is selected for sharing, wherein the auxiliary content is shared on one of the main devices or select ones of the secondary devices, the sharing of the auxiliary content is based on share attributes defined for the auxiliary content.

In one embodiment, the auxiliary content is retrieved from one or more content sources.

In one embodiment, the auxiliary content is provided by one or more users with whom the multimedia content is shared or by a user initiating the sharing of multimedia content.

In one embodiment, a method for sharing multimedia content is disclosed. The method includes detecting selection of multimedia content for sharing. The multimedia content for sharing is selected on a secondary device that is paired with a main device. The main device is configured to render publicly viewable multimedia content shared by the secondary device. Share attributes are identified for the selected multimedia content for sharing on the main device. The share attributes identify information related to a user initiating the sharing and information related to the multimedia content selected for sharing. The selected multimedia content is presented on the main device that is paired with the secondary device. The presentation enables public viewing of the selected multimedia content on the main device.

In one embodiment, presenting includes populating the selected multimedia content as a thumbnail on the main device.

In one embodiment, presenting further includes populating an icon of the user initiating the sharing alongside the thumbnail.

In one embodiment, the main device includes a plurality of thumbnails selected for sharing by a plurality of users.

In one embodiment, the selected multimedia content rendered in the thumbnail for rendering on a display screen of the main device is promoted for rendering on a main portion of the display screen of the main device, the promoting causes switching of multimedia content currently rendered on the display screen of the main device with the selected multimedia content.

In one embodiment, the promoting is accomplished through user input at the secondary device.

In one embodiment, the presenting includes switching the multimedia content currently rendering on a display screen of the main device with the selected multimedia content.

In one embodiment, a method for sharing multimedia content is disclosed. The method includes detecting selection of multimedia content for sharing. The selection is provided on a secondary device that is connected to other secondary devices over a network and paired with a main device. The main device is configured to render publicly viewable multimedia content shared by the secondary device. A list of users for sharing the selected multimedia content is presented at the secondary device. Each of the users in the list are associated with at least one of a secondary device or a main device for viewing the multimedia content. Share attributes related to sharing of the selected multimedia content are received. The share attributes identify select ones of the users for sharing the selected multimedia content. The selected multimedia content is presented at the select ones of the main devices or secondary devices of the select ones of the users based on the share attributes defined for the selected multimedia content. The presentation enables viewing of the selected multimedia content on the corresponding secondary devices or main devices.

In one embodiment, the share attributes are received through user input at the display screen of the secondary device.

In one embodiment, the list of users presented are identified from a social network of a user sharing the multimedia content.

In one embodiment, the list of users presented are identified based on the multimedia content selected for viewing and sharing.

In one embodiment, presenting the list includes presenting icons of each of the users in the list at the secondary device. The icons identify the users and the secondary and main devices associated with the users.

In one embodiment, presenting the selected multimedia content includes rendering the selected multimedia content at the corresponding secondary devices or the main devices of the select ones of the users.

In one embodiment, presenting the selected multimedia content includes adding the selected multimedia content at the corresponding main devices or the secondary devices as a thumbnail.

In one embodiment, auxiliary content for the multimedia content selected for sharing is received from a user. The sharing of the auxiliary content is based on the share attributes defined therein, wherein the user sharing the auxiliary content is one of a user initiating the sharing of the multimedia content or the user selected for sharing the content.

In one embodiment, the auxiliary content is shared with the one or more users on the respective secondary device of the users to enable private viewing of the auxiliary content.

In one embodiment, the auxiliary content is shared with the one or more users on the respective main device of the users to enable public viewing of the auxiliary content.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings.

FIGS. 2A-2D illustrate a screen renditions of a user interface provided at a secondary device for sharing the multimedia content, in accordance with various embodiments of the present invention.

DETAILED DESCRIPTION

Figure 1:
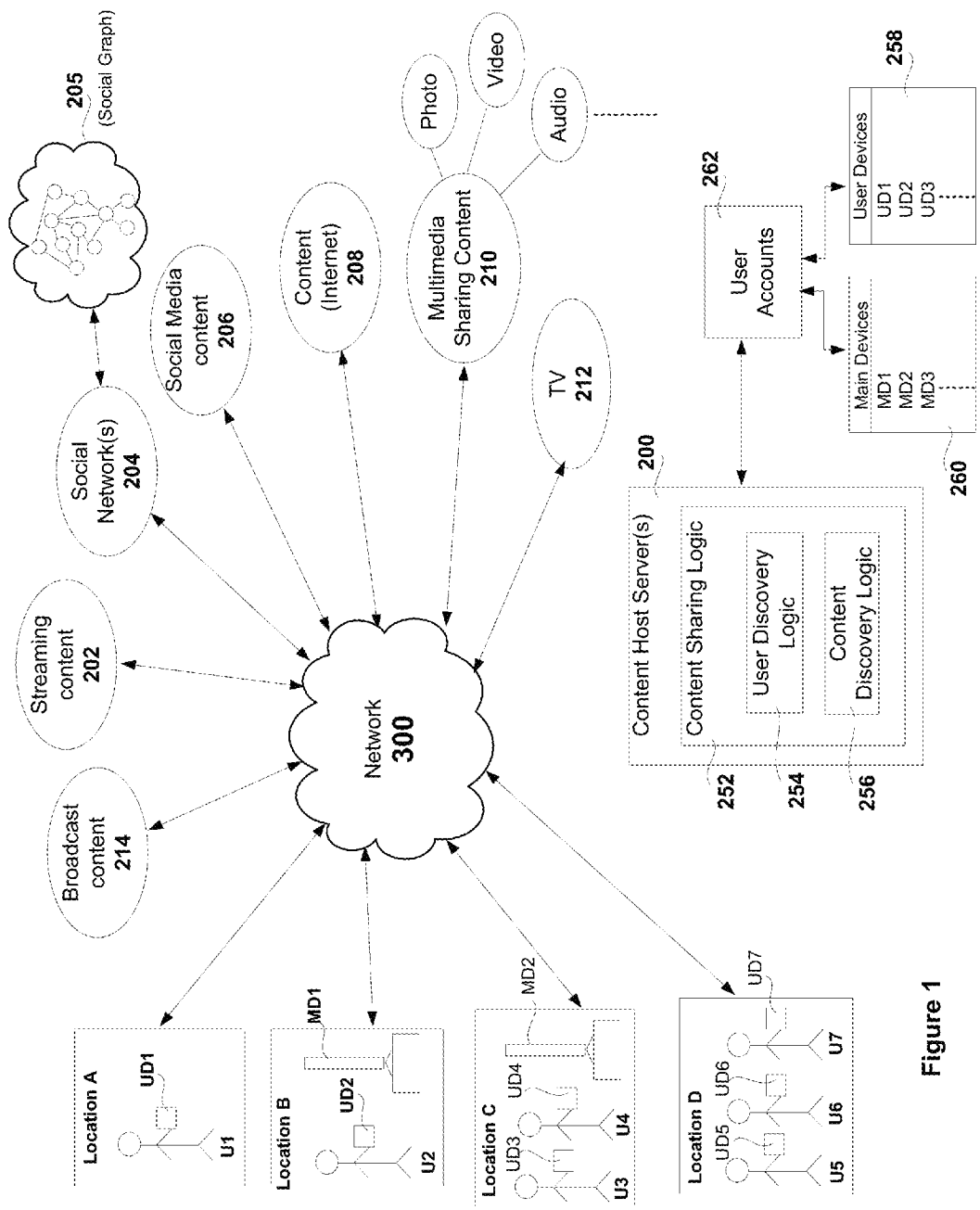
FIG. 1 illustrates a simple block diagram of a system that is used for sharing multimedia content, in accordance with an embodiment of the present invention.

Embodiments of the present invention provide system, computer readable media storing an application with program instructions, and methods for sharing multimedia content from secondary devices with main devices and with other secondary devices associated with a plurality of users. The various embodiments define a user interface that allows users to consume and share multimedia content on their secondary devices (for e.g., mobile devices), such as smart phones, PDAs, tablet PCs, notebooks, etc., while watching television (TV) on a main display screen of a main device, such as a main TV screen. A user can share the content publicly with all the users by sharing the content on the main device or privately with select ones of the users by sharing the content with other secondary devices. The content may include live video streams streaming synchronously, web video streaming/transmitting asynchronously, web content (such as news articles, images, etc.), social media streams (for e.g., social media content, social media updates, etc.) or any other multimedia content that can be accessed, viewed and shared. The interface is also configured to bring social awareness of what users are watching after they have shared the content. An application detects what multimedia content a social contact of a user is watching in a remote location and enables the sharing of such content on secondary devices and main devices distributed across various locations, wherein the content may include live video streams, web video, web content, social media streams, etc. The application enables building a virtual living room by bringing together users across geography and provides the necessary interface to encourage collaborative viewing and sharing of the content. The content includes any multimedia content that can be accessed over a network, generated, retrieved, rendered and shared.

The system first detects the secondary devices near a main device and pairs the secondary devices with the main device, if the pairing has not been done. The pairing usually occurs during initialization of a secondary device or the main device. In some embodiments, the pairing is accomplished using a protocol, such as a "Device Communication" protocol. The protocol is not restricted to the aforementioned protocol and that other protocols may be used to pair the secondary devices with the main device. If the pairing has already been done, the system detects the pairing of the secondary devices with the main device. Once the devices are paired, content accessed and viewed on one device may be shared with other devices, wherein the device could be a main device or a secondary device, such as a mobile computing device. In one embodiment, the content can be privately shared with select ones of the users and such private sharing can be accomplished by sharing content between the secondary devices. Similarly, the content can be shared publicly with other users and such public sharing can be accomplished by sharing content on the main device. In one embodiment, content selected for sharing privately or publicly may be generated by a user on the user's secondary device and shared with other secondary devices and/or the main devices. In one embodiment, the other users that are selected for sharing multimedia content may be users that are socially connected to a user initiating the sharing and the socially connections may be obtained from social graphs defined in a social network of one or more social media content providers. In another embodiment, the other users that are selected for sharing multimedia content may be users that are not socially connected to a user initiating the sharing but share the same interest in the multimedia content viewed by the initiating user.

With the general understanding of the invention, detail description of the various embodiments will now be described with reference to the drawings.

FIG. 1 illustrates a system that is used for sharing multimedia content amongst main devices and one or more secondary devices that are paired with the corresponding main devices during initialization of the respective devices. As mentioned earlier, the main devices and each of the secondary devices may be paired with each other during initialization of the respective devices and maintain such pairing over time. In one embodiment, after the initial pairing of the devices, options may be provided at the respective devices to pair/un-pair the devices from one another. Each of the secondary devices and the main devices associated with a plurality of users are configured to connect to a network 300, such as the Internet, through wireless or wired connection to interact with each other and with a server device 200, such as a content host server, content accumulator server, cloud game server, cloud content server, promotional content server, etc., to access multimedia content for viewing and sharing.

As illustrated in FIG. 1, a secondary device UD1 is associated with User U1. The User U1 may be accessing the content provided by the server 200 from location A. Similarly, a secondary device UD2 and a main device, such as television, MD1 is associated with user U2 and user U2 may be accessing the content provided by the one or more of the servers 200 from location B. Secondary devices UD3, UD4 and a main device MD2 are associated with users U3 and U4, respectively and users U3 and U4 are accessing the content provided by the one or more servers 200 from location C. Secondary devices UD5, UD6 and UD7 are each associated with users U5, U6 and U7, respectively and users U5, U6 and U7 are accessing the content provided by one or more of the servers 200 from location D. The embodiment illustrated in FIG. 1 is exemplary with each user being associated with one secondary device and/or one main device. It should be noted that each user may be associated with more than one secondary device and more than one main device.

Each of the secondary devices and the main devices associated with the plurality of users run a portion of the content sharing application that communicates with the content host server 200, on which the main content sharing application logic is running In one embodiment, the portion of the content sharing application on the secondary devices and the main devices are specific to the respective secondary/main devices. The device portion of the application on the secondary devices renders the respective users private view and handles notifications of which content has been shared with the users privately and the device portion of the application on the main device renders the content that was shared by respective users for public view and handles notifications of which content has been shared with other users publicly. In some embodiment, every time a multimedia content is shared on the main device for public view, a notification may be sent to other users in the respective initiating user's social network to inform the other users that new content is being shared publicly so as to draw the attention of the other users back to the main device for collaborative TV watching. Toward this end, the device-side application at each of the secondary and main devices provide the appropriate interface to enable the respective device to access, view, share multimedia content and to interact with other main/secondary devices. Additionally, the device-side application on the secondary devices is configured to enable generation of content, such as photos, images, annotations, etc., on the respective secondary devices and to enable sharing of the generated content with other users privately on the corresponding secondary devices or publicly on the main devices.

In some embodiment, the secondary device side application may be a mobile application through which the user can access the content for viewing and sharing with other users on the respective main or secondary devices associated with other users. In this embodiment, as the users access the mobile application and are navigating through the different content available through the internet, the server-side application in conjunction with the mobile device application may be able to discover friends or other people that are viewing similar content and may provide such information in the form of social contact information to the user on the secondary device. The application on the secondary devices may be used to browse the internet for auxiliary content related to the content rendered on a main device or auxiliary content that the user wishes to share with one or more users, retrieve the auxiliary content information and enable sharing of the auxiliary content information with one or more users privately or publicly. In addition, the application on the secondary devices may be used to generate content, such as annotations, photos, etc., and share such content with other users.

The server 200 may be a host content server that provides the multimedia content or may be a content accumulator that receives content from a plurality of sources, such as streaming content 202 from a content provider, social contact information from a social network 204 that provides contact information for a plurality of users based on their respective social graphs 205, social media content 206 from one or more social media content providers, internet content 208 from internet content providers, multimedia content 210 (such as photo, video, audio, etc.) for sharing from multimedia content providers, Television content 212 from cable and network providers, broadcast content 214 from various individual and network broadcast providers.

The content host server includes a server-side content sharing logic 252 that is configured to detect pairing of devices (if already paired) or provide interface to pair the devices, such as the secondary devices and main devices. The server-side content sharing logic 252 is also configured to provide content from the various sources for viewing and sharing, identify social contact of users to share the content with and enable sharing of the content with one or more users either publicly or privately. The content sharing logic includes user discovery logic 254 to keep track of which users devices (both secondary and main devices) are communicating with the server when requesting multimedia content, what multimedia content has been requested for watching on each of the secondary devices and the main devices, what multimedia content the users want to share with other secondary devices or with the main device and the server application identifies the appropriate content for rendering on either the publicly viewable display screen associated with the main device or the display screen of the privately held secondary device.

Toward this end, the user discovery logic identifies the user identification information, including the user identifier, user attributes, etc., for the user associated with each of the secondary devices and the main devices. The user discovery logic 254 then uses the identification information to query the user device mapping table 258 and the main devices mapping table 260 to identify the one or more secondary devices and the one or more main devices that are associated with the user. In one embodiment, the user discovery logic is configured to obtain the user identifier and user attributes by accessing the user account information 262. In one embodiment, the user, during initialization of the secondary device and the main device may provide the user account information so that the respective devices may be able to obtain appropriate multimedia content from different content sources that is available for the user account based on the user subscription. The account information, thus, will be able to provide the identity of each of the main devices and the secondary devices that are used by the user to access the content provided by the content sources, provided by the server and the content that is available on the internet. The multimedia content provided by the server includes any content including content from a cloud-based system.

A content discovery logic 256 within the content sharing logic 252 receives the information from the user account and identifies the content (e.g., multimedia content) that is available to the user based on the user account information. The content may also include content available on the internet, content generated by the user, and content provided by one or more content sources that the user has subscribed for or is able to access. Toward this end, the content discovery logic 256 is configured to interact with the various content sources over the network 300 to identify and retrieve the appropriate content for the user based on the user account information, package the content according to communication protocol used to communicate between the secondary/main devices and the server, and transmit the packaged content to the respective secondary devices and the main devices associated with the users using the communication protocol, for rendering.

The packaged content is received, interpreted and rendered at the secondary device. In one embodiment, the user interface of the secondary device includes three main regions for rendering content. FIGS. 2A-2D illustrate the screen rendition of the user interface on the secondary device 301 identifying the three main regions and the content rendered in the respective regions. The first main region is the top region 310 of a display screen available on the secondary device 301. The top region 310, depicted as "Video" in FIG. 2A, acts like a mini-TV screen rendering the selected multimedia content. A user may be able to browse available multimedia content on the secondary device and view the selected content privately. In one embodiment, the available multimedia content may be provided on the secondary device at a third region 330 and user input at any of the multimedia content presented in the third region 330 will cause selection of the multimedia content on which the user input is detected. The selected multimedia content is rendered in the top region 310. The selected multimedia content may also be shared with the main device publicly. In the case of public sharing, the selected content may be viewed simultaneously in the top portion of the display screen of the secondary device 301 and on a display screen of the main device.

Below the first main region, is the second region 320 on which a carousel of multimedia content is rendered. In one embodiment, the multimedia content is rendered in the carousel in the form of thumbnails. Content in each thumbnail of the carousel corresponds to a TV channel or multimedia content shared by other users publicly or TV channel/multimedia content that is rendering on the main device. The carousel of content is depicted as "TV streams" in FIG. 2A. From this carousel of content, users may be able to manipulate what is being shared or viewed on the main screen of the main device. For example, for the multimedia content that is selected from the carousel bar, the users can manipulate the size of the display of the multimedia content to full or largest display in the main screen, un-share a specific multimedia content from public viewing by deleting the corresponding thumbnail from the carousel bar, etc.

Below the second region is the third region 330 with a grid of multimedia content available at the secondary device, as illustrated in FIG. 2B. In one embodiment, the grid may present only TV channels that are available that a user of the secondary device has subscribed. In another embodiment, in addition to the TV channels, other content other than TV content may be presented in this TV grid region and the user will be able to select and share the content with users publicly or privately. In one embodiment, the other content may include content, such as images, videos, audio streams, pictures, photos, annotations, etc., captured or generated on the secondary device.

In one embodiment, the user can provide input at one of the channels or content in the grid, as illustrated in FIG. 2B, using finger gestures, such as a tap, on a touch screen interface of the secondary device and such user input causes the content to render in the first region of the user's own secondary device. In this embodiment, the user input enables private viewing of content by the user. In another embodiment where a multimedia content is already rendering in the first region 310, user input may cause the multimedia content currently rendering in the first region of the user's secondary device to cease rendering and cause the newly selected multimedia content, identified by the user input at the grid 330, to begin rendering in the first region 310. The user input specified in this embodiment is exemplary and other user inputs may be used for selecting the content from the third region. In one embodiment, the users can tap and hold the same channel or multimedia content in the grid portion in the third region 330 and this user action would cause the selected multimedia content from the grid to become a content stream that is shared publicly on a main screen (i.e., a display monitor) of the main device (i.e., the TV). Thus, the users are provided with the ability to view content privately with or without other users, as well as share content with other users publicly or privately. In one embodiment, the user is able to view multimedia content selected at the secondary device privately in the first region 310 on the secondary device and simultaneously view other multimedia content rendered in the main screen of the main device that other users have shared publicly. In the aforementioned embodiments, "tap" gesture provides the playback within the secondary device and the "tap and hold" gesture allows the content to be shared with other users publicly.

Figure 2A:
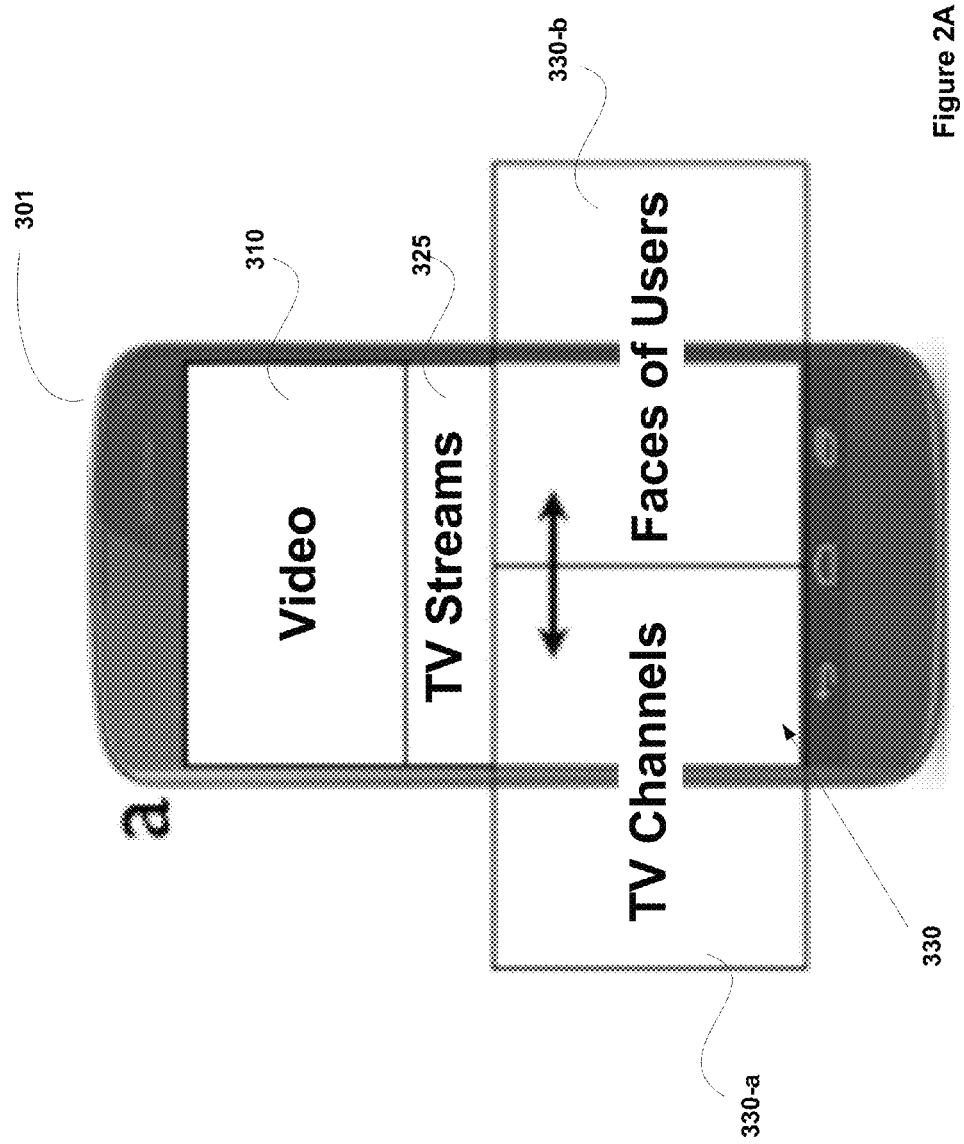
Figure 3:
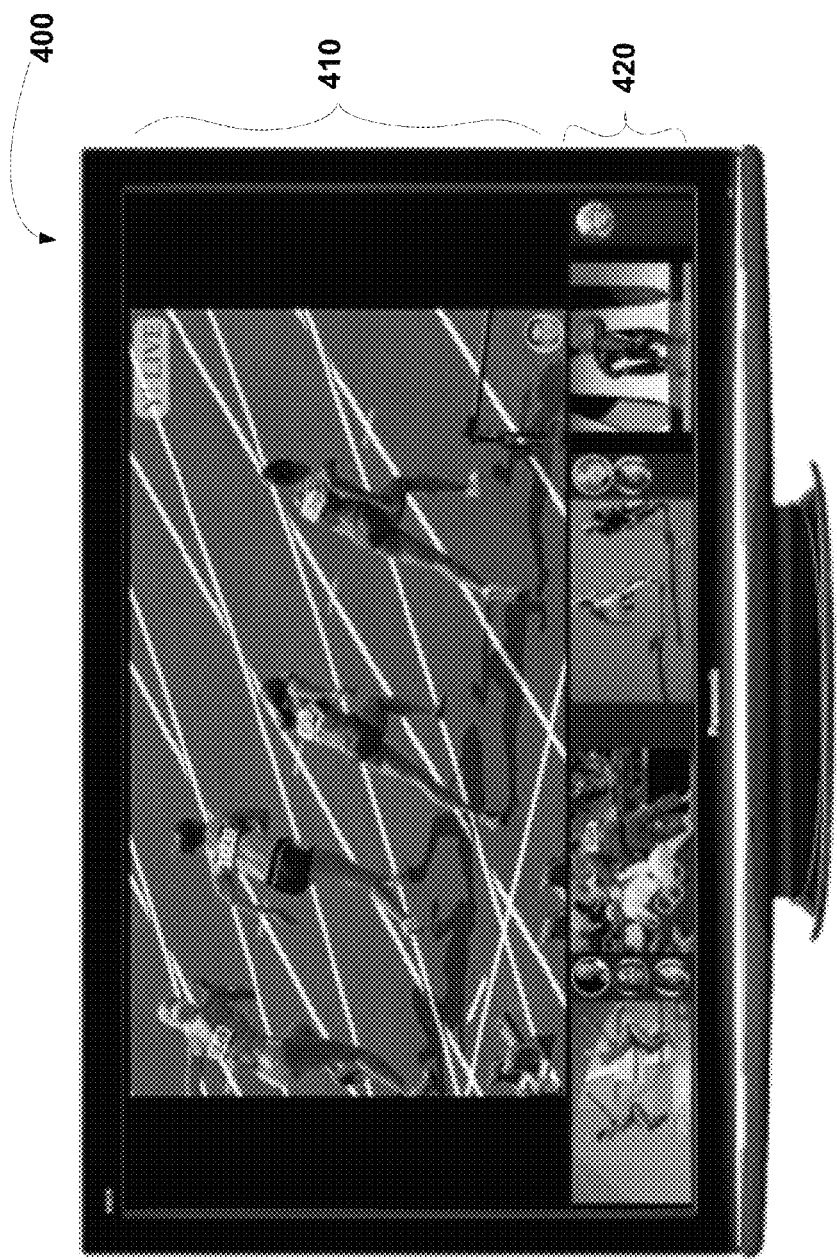
FIG. 3 illustrates a screen rendition of a user interface provided at a main device that is used for presenting publicly viewable multimedia content, in accordance with an embodiment of the present invention.

In one embodiment, when a user selects a multimedia content from the third region for sharing, the shared multimedia content will appear as a thumbnail at the bottom of the main device screen. FIG. 3 illustrates the user interface on the main device's display screen 400. Referring simultaneously to FIGS. 2A and 3, the main device's display screen 400 is divided into a main display portion 410 and a thumbnail portion 420. The thumbnail portion 420 identifies a carousel of thumbnails of the multimedia content shared by a plurality of users publicly and the main portion 410 renders a multimedia content shared publicly. The multimedia content selected for sharing publicly at the secondary device 301, is also populated in the thumbnail in the second region 320 on the secondary device. In one embodiment, the multimedia content newly shared by the secondary device 301 may not be rendered at the main display portion 410 of the main device screen 400 but is added as a thumbnail. In this embodiment, the particular user's image or icon may be populated alongside the shared content in the thumbnail to identify the user that shared the content. If more than one user shared the same content, then the respective users' images will be populated in the thumbnail alongside the shared content. In one embodiment, the images/icons at each shared content thumbnail indicates that the particular user(s) were each watching the shared content privately before sharing that content publicly with other users. In one embodiment, the shared multimedia content in the thumbnail may be the content that is currently playing on the respective users' mobile devices. In one embodiment, the facial icon or image being rendered in the thumbnail may be provided as an option—allowing the users the option to render their facial icon or not. In one embodiment, when the number of users sharing the same content exceeds a predefined threshold value, the images of the users sharing the content may be presented in a separate window. In one embodiment, the images of the users sharing the content presented as a thumbnail may be provided as a pop-up window.

Continuing to refer to FIGS. 2A and 3, in one embodiment, the thumbnails in the TV stream section 320 rendered in the second region of FIG. 2A matches the thumbnails shown on the thumbnail section 420 of the main TV screen 400. Similarly, the multimedia content that is rendering in the top region 310 of FIG. 2A is synchronized with the multimedia content rendering on the main portion 410 of the main screen 400. The thumbnails in both the main screen and the TV stream section of the secondary device are the multimedia content (including TV channels and other multimedia content, such as social stream content, audio content, photo content, etc.) shared by other users that are either co-located or remotely located.

The various embodiments described herein allow users to connect different living rooms and bring them together in a virtual living room. In one embodiment, the sharing of multimedia content can be done at different levels—i.e., based on social connectiveness or public sharing using user preferences. In one embodiment, the content presented in grid portion 330 of FIG. 2A, the content of the grid is similar to the program guide of TV that shows the available TV shows at the main screen of the main device. In another embodiment, in addition to the TV shows, video streams, other content modules provided by other content providers, including promotional content providers, or content that users have generated or have access to and/or are interested in sharing with other users, is also provided. The other content can be social media streams (textual, video, audio, etc.), photos, or any content that is obtained from browsing the internet that a user is viewing or is interested in sharing.

When a user selects a particular TV show or multimedia content rendered in the grid 330, then that content/show will begin to automatically render in the top portion 310 of the display screen in the secondary device for private viewing, in response to the detection of user input (for example, a tap gesture) received from a user. If the detected gesture is a tap-and-hold gesture, for example, then that content or show is sent to the main screen of the main device for sharing publicly with other users. The selected content will populate the thumbnail portion 420 of the main device's display screen 400 as well as populate the user's carousel of thumbnail 320. The population of the selected content as a thumbnail in the thumbnail portion 420 of the main device is accompanied by an icon of a user that shared the content to the main device. The information in the thumbnail thus provides the list of users that are currently viewing the multimedia content on their mobile devices when they share the content with the main device.

A user may be able to promote a thumbnail content 420 provided at the bottom of the display screen of the main device to cause it to render at the main portion 410 of the display screen 400 of the main device. The user may be able to promote the multimedia content for rendering in a full screen mode on the main device by providing user input, such as tap and hold finger gesture, on the multimedia content presented in the thumbnail in the carousel bar at the user's secondary device. The carousel includes multimedia content that has already been shared, in the form of thumbnails. In one embodiment, the UI of the secondary device would detect the user input (for e.g., tap-and-hold gesture) at the particular content rendered in the carousel and overlay an icon that provides an option to select a full-screen mode for rendering the selected content. In one embodiment, in response to the overlay, the user may be able to drag the thumbnail to the overlaid icon available in the main display area of the secondary device. The dragging motion will cause the swapping of the multimedia content that is currently being rendered at the main portion 410 of the main device 400 with the selected content. The multimedia content that is shared with the main device is visualized as a "stream" of multimedia content. In one embodiment, when an old content is swapped with a newly selected content module, the old content is demoted to a thumbnail size and is rendered within the thumbnail section 420 with user icons that recommended the old content for sharing. The overlay of an icon and the dragging gesture are exemplary and should not be considered limiting or restrictive. Other user input forms, icons and/or informational messages may be used for providing the option at the secondary device to select content for rendering in full-screen mode at the main device.

Along similar lines, a user may be able to "unshared" a thumbnail content rendered within the thumbnail section of the main device's display screen by removing the thumbnail from the thumbnail section of the main device's display screen using the TV screen portion 320 of the secondary device. The user interface provided at the secondary device may enable a user to provide a user input, such as a tap-and-hold gesture, at the selected content rendered in the TV stream section 320 on the secondary device 301. In response to the tap-and-hold gesture, a second icon may be overlaid on the top portion 310 of the display area in the secondary device 301. In one embodiment, the second icon may be provided in the form of an "X" option (for delete). In other embodiments, the second icon may be provided as a radio button, etc. In one embodiment, the unshared option may be provided alongside the modal change option. User input, in the form of a drag gesture, may be provided dragging the selected content from the TV stream portion 320 (that includes all videos/content streams that are shared publicly) to the delete icon and such user action will result in the removal of the selected content from the TV stream portion 320 at the secondary device as well as the main device.

In one embodiment, a user may be associated with just a secondary device. In another embodiment, the user may be associated with a secondary device and a main device. In yet another embodiment, the user may be associated with a plurality of secondary devices, a plurality of main devices or combinations of both the secondary devices and main devices. The first time the user registers to the application, such as the device-side application, the user may be provided with an option on the user interface at the secondary device/main device to import his/her friend/social contact information. The user interface may provide the user to selectively choose the friends/social contacts for sharing the content. Additionally, the user may be provided with a list of multimedia content that the user may select for watching on the secondary device. In one embodiment, the list of multimedia content may be an extract of a TV guide that lists the content that is available to the user based on subscription with one or more content providers.

In another embodiment, in addition to the TV guide, other content may also be provided for viewing and sharing. The other content may include content generated by the user, such as photos, annotations, images, social media content, etc., or content generated by other users for the user account, such as social media streams, etc. The content is provided in the second region of the display screen of the secondary device. In addition to the content, social contacts, friends, etc. of the user may also be provided in the grid section provided in the third region 330. As a result, as illustrated in FIG. 2A, the grid section 330 of the display screen portion of the secondary device is divided into two sections, a content rendering section—depicted as "TV Channels" 330-a, and the social contact section—depicted as "Faces of Users" 330-*b*. In one embodiment, the social contact section may provide a list of users identified as social contacts of the user during the initialization of the user's secondary device. In addition to the initialization time, the social contact information may be identified during usage of the secondary device. The user interface at the secondary device may interact with the host server to obtain the social contact information for the user provided in the social network of one or more social media providers and provide the ability for the user to select the social contact with whom the user wishes to share multimedia content. The selected social contact is populated in the social contact section 330-*b*. As mentioned earlier, the social contact may be contacts within the social circle of the user or may be users that share similar interest in the multimedia content as the user.

In one embodiment, the user may be able to share the multimedia content with other users using the user interface in the secondary device. The user interface provides a grid portion 330 in which icons of the social contacts of the user are rendered and the user may use a finger gesture, such as a "swipe" gesture to access the faces/avatars/icons of other users identified by the user for sharing content. In one embodiment, the user issues a swipe gesture to the left at the grid section and the user's finger gesture, causes the social contact section 330-*b* to be rendered in the grid section, as illustrated in FIG. 2C. In the embodiment illustrated in FIG. 2C, in response to a detection of the swipe gesture registered at the touch screen user interface in the display screen section of the secondary device, the grid section 330 may begin to replace the content rendering ("TV Channels") section 330-*a* rendering some of the multimedia content available for the user with the social contact ("Faces of Users") section 330-*b* rendering icons/images/avatars of the social contact identified by the user within the user's social circle/circle of interest. FIG. 2C illustrates the transition of this replacement in the content in the grid section 330 from content render section 330-*a* illustrated in FIG. 2B to the social contact section 330-*b* illustrated in FIG. 2D. FIG. 2D illustrates the full transition of content from the content rendering section 330-*a* to the social contact section 330-*b* in response to the swipe gesture registered at the touch screen user interface. In one embodiment, when the user access the icons of other users for sharing the content, additional icons identifying the secondary devices associated with the other users is rendered for user selection. The secondary devices presented are those that are connected and paired to the main devices and used by the other users to access, view and share content. The user may share the multimedia content currently being viewed by the user in the top portion 310 of the secondary device of the user, with another user by selecting the respective user's icon rendered in the grid portion 330. The selecting of the user's icon may be provided in the form of a tap-and-hold gesture. In one embodiment, in response to the user share the content at a particular secondary device of the other user, the user interface at the recipient user's secondary device will highlight an icon below the TV channels region 330-*a* indicating that a multimedia content has been shared with them. In one embodiment, in addition to providing a highlighted icon for the shared multimedia content, the recipient's users grid represented by the social contact section 330-*b* may highlight the face/image/avatar/icon of the user sharing the multimedia content. The recipient may select to play the multimedia content shared by the user by providing user input, such as tap gesture, on the user's icon in the user grid. The recipient's user input causes the multimedia content shared by the user to being playing at the same time offset as that of the multimedia content currently rendering at the secondary device of the user.

In one embodiment, a user may choose to view one of the shared "streams" on their own secondary device. The shared streams are the ones that were shared publicly by users by moving them to the main device for rendering. The user may select the multimedia content from the TV streams region 320 on their own secondary device and providing user input, such as tapping the stream. The user input causes the selected content to be rendered in the top region 310 of the secondary device's display screen. The user may be able to view all the multimedia content provided in the thumbnail portion in the TV streams section 320 of the secondary device by using a swipe gesture or other user input and select the appropriate multimedia content that was provided in the main device to be rendered on their secondary device.

In one embodiment, the other users presented in the social contact section 330-*b* of the user may have accessed the application on their secondary devices or their main device and may be actively watching some multimedia content that is available to them. In this embodiment, the other users have accessed the application on the secondary device(s) or their main device(s) to view the multimedia content. In this embodiment, when the user swipes to the left in the grid section 330 to access the social contact section 330-*b*, the icons/avatars/images of the other users identified as social contacts are active and are available for sharing. The user can select any one of the social contacts to share the multimedia content that the user is currently viewing and wants to share, or have access to the content that the social contact is watching on their secondary device. In one embodiment, the user may be able to provide a tap gesture on one of the social contacts provided in the social contact section 330-*b* and the user is provided access to what the selected social contact is watching on his/her own secondary device or main device. In another embodiment, the other users identified in the social contact of the user may not have accessed the application to view the multimedia content. As a result, when the user swipes to the left, the other user's faces/avatars/icons/images rendered in the social contact section are greyed out. The user is thus able to access content viewed by other users as well as share content with the other users who are actively participating by accessing the content sharing logic application.

Initially, when a user registers to the content sharing logic application using the device-side application, the thumbnail portion 320 may not be populated as nothing has been shared publicly by the user, in one embodiment. The user may view selective content privately and such viewing will not populate the TV stream area 320 at the secondary device or the thumbnail portion 420 of the main device. If the user watching a multimedia content decides to share with other users by sharing the content publicly, the selected content (i.e., TV show or other content) will automatically populate as a thumbnail both at the thumbnail portion 420 on the main screen 400 of the main device and the TV stream section 320 associated with the secondary devices of each of the other users, even if the other users are not watching any TV or content. The content provided to the other users is a curated version of the multimedia content available to a user. In the case where a particular user does not have a secondary device associated with him/her, the content is provided at the particular user's main device allowing the user to view the content shared by other users.

In one embodiment, when the other users that are social contacts of a user are using the content sharing logic application service and select to share TV content with the user, the user upon logging into the application for the first time may be able to view the TV stream section 320 on the secondary device that is automatically populated with the thumbnail of content shared by other users publicly. In one embodiment, the social contacts of a user may be actively using the application and some of the user's social contacts are watching contents privately and some other users within the social contacts are publicly sharing the content with other users. In this embodiment, the TV stream section of the user will be populated with the publicly shared content. In one embodiment, the content privately watched by the other social contacts of the user may be accessed by individually tapping on each of the social contacts icon. In this embodiment, the access to the private content may be provided using one or more share attributes that include user identifier of users that are allowed to access the privately viewed content, etc. Specific content can be selected from the grid section of the display screen of the secondary device. Accordingly, when the user taps on a social contact icon when the social contact is privately viewing content or TV channel, the view of the social contact is shared with the user provided the settings for sharing provided in the share attributes allow the user to access such content.

In one embodiment, when a user has a lot of friends/social contacts and the friends/social contacts are all sharing content with the user, the application may select the most recently shared content to populate the TV stream section within the carousel section 320 of the secondary device. Alternately, the application may promote content that majority of users are watching, or content shared by social contacts/friends whose icons gets selected the most or whose recommendation gets the most views or other such criteria, the content from a social contact that the user finds interesting, etc. In another embodiment, the user is provided with a user interface to select the criteria for prioritizing the social contacts so that the application can present the content shared by the social contacts in decreasing order of priority. The application may provide options to the user to select attributes of social contacts so that the application can present the content of these social contacts in order of priority. The application uses these user attributes identifying the social contacts expertise, interest, popularity, frequency of postings/sharing, etc., as share attributes when sharing the content by the user with other users. In one embodiment, the thumbnail in the carousel bar can be customized for each user based on the attributes selected by the user and based on attributes of the social contacts that are sharing the multimedia content.

In other embodiment, the application may engage a recommendation system to provide contextually relevant content shared by other social contacts based on the context of the content selected by the user for watching on the secondary device. The secondary device can be a mobile phone, table PC, desktop, laptop, or any other internet connected computing device. Touch screen, single click, double click, etc., can be used as part of user action.

In one embodiment, the application provides an option to increase or decrease the size of the display region on the secondary device to allow the selected content to be viewed in full screen mode or partial screen mode, in a landscape mode or portrait mode. The application may use sensors built into the mobile device to render selected content in the appropriate mode.

In one embodiment, the application may surface the interface at the secondary device based on new content being shown or may show part of the selected multimedia content in the Video section 310 of the secondary device's display screen and let the user provide user input to adjust the amount of content and format (landscape or portrait) for rendering the content.

Referring to FIG. 3, in one embodiment, when more than one user shares content publicly, the shared content will be rendered as thumbnails at the bottom of the thumbnail portion 420 of the main screen 400. The content that is rendered in the main portion 410 of the main screen is selected from the thumbnail portion 420 based on the popularity of the recommending user, experience of the recommending user, seniority of the recommending user (either seniority pre-defined by a user (for e.g., senior in a house-hold) or seniority defined based on an algorithm), or other user-defined criteria. In the case of seniority based criteria, the user (i.e., a parent) may set the application in such a way that the children may be provided access to the application through their own secondary devices and the main device application may be controlled using administration access privilege. In this case, the administration access allows the application to use the user profiles of the users in the household to grant special privileges to certain secondary devices within the household to control what can be shared publicly and what can be viewed on the main device. Alternately, the application may dynamically set the profile based on who is accessing the application to view and share the content on the main device using the user account information and/or type of content selected for rendering on the main device.

The application thus provides some level of flexibility in allowing a user to control what is rendered on the main portion of the main device, when a plurality of users are trying to control what is rendered on the main portion of the main device. In another embodiment, when more than one user is sharing the same content, the shared content is rendered as a thumbnail in the thumbnail portion 420 of the main device and the icons of the shared users is provided alongside to allow other users to view who recommended the shared content.

In one embodiment, a user who is proximate to the main device or is physically present in the location where the main device is located is allowed to control what is being selected for rendering at the main portion of the main device's display screen 410. In the case where the content being watched is to be changed at the main portion of the main device's display screen 410, an information message may be popped on the main screen indicating that states, "User A is trying to push the content for viewing in the main portion of the screen of the main device. Would you like to accept the content?" or some such informational message. Based on the user action in response to the informational message, the content rendering in the main portion of the main device's display screen 410 is switched to render a different content selected for viewing. The application also provides ability to allow users to democratically select content for watching on the main device. The application provides the ability for local people to connect to and control what is rendered on the local TV and allowing remote users to have the ability to control what is shown.

Figure 4:
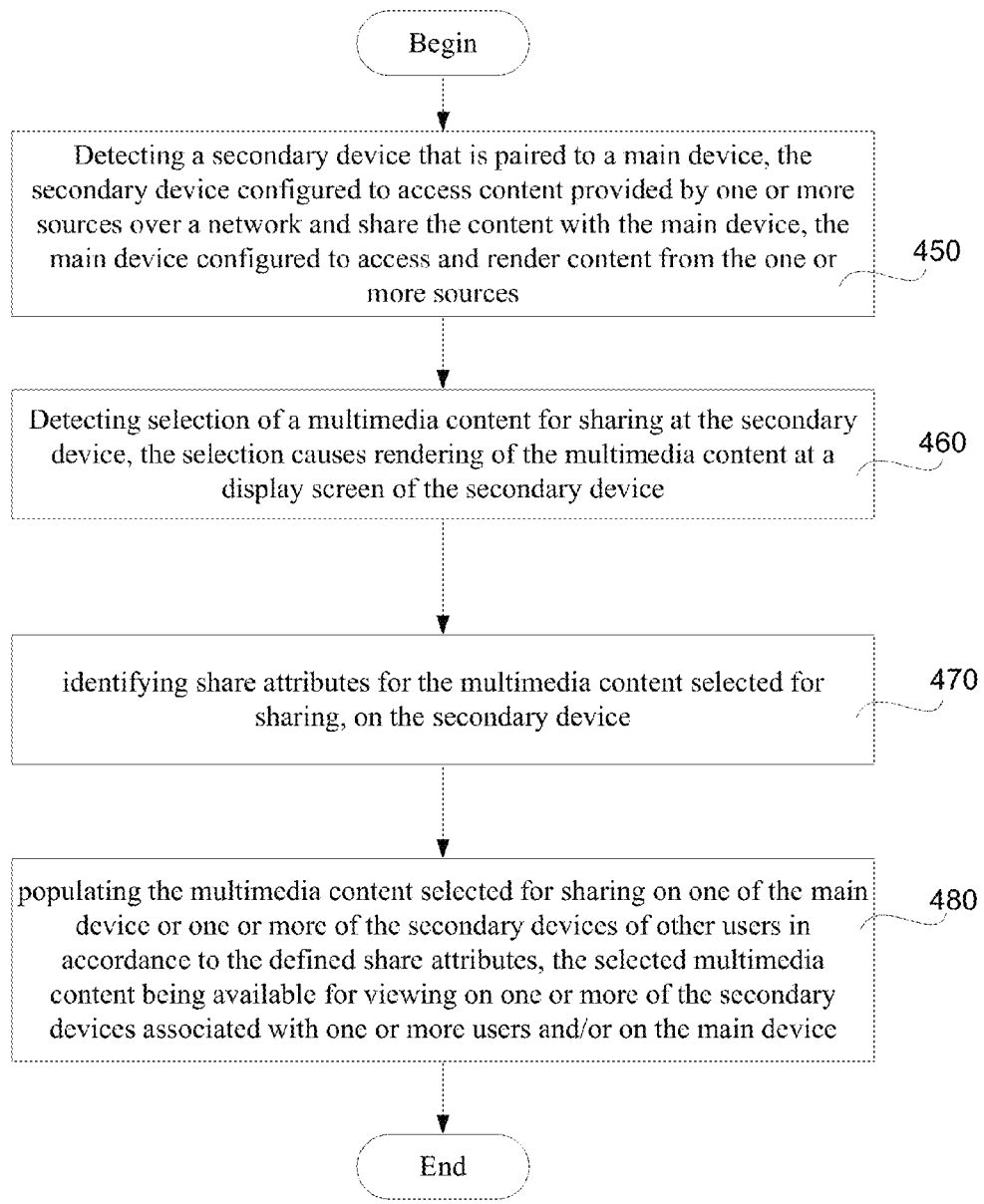
FIG. 4 illustrates a flow chart identifying method operations followed for sharing multimedia content, in accordance with an embodiment of the invention.

FIG. 4 illustrates method operations for sharing multimedia content, in one embodiment of the invention. The method begins at operation 450 with the detection of a secondary device that is paired to a main device. The main device is used to render publicly viewable multimedia content. The secondary device is configured to access content provided by one or more content sources over a network and share the content with the main device. Selection of a multimedia content for sharing is detected at the secondary device, as illustrated in operation 460. The selection causes rendering of the multimedia content at a display screen of the secondary device. Share attributes defined for sharing the multimedia content is identified, as illustrated in operation 470. The multimedia content selected for sharing is populated on one or more of the main devices or one or more of the secondary devices of other users in accordance to the defined share attributes, as illustrated in operation 480. The selected multimedia content is available for viewing one or more of the secondary devices associated with one or more users and/or on the main device.

The various embodiments described herein define an application tool that provides an interface that can be extended to define a virtual living room for TV watching. The application tool allows the secondary devices, such as mobile devices, to share content with other secondary devices and with the main devices. The application tool allows users to share what they are watching with other users and are provided with options to view what other users in their social circle are watching privately or publicly. The application tool also provides a mechanism to link the application with a user's social network and allow the user to notify other users in the social network on what content the user is watching. The other users may be given the option to virtually join the group viewing. The application tool provides the interface to enable addition of the other users that wish to join the group to be added to the user grid, defined in the social contact section, of the user. The application tool also allows the user to expand the view of available content in the channel view grid provided in the third section on the display screen of the secondary device.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network. A sample computer system identifying the backend server infrastructure used to power the content host server 200 of FIG. 1, is depicted in FIGS. 5A-5C.

Figure 5A:
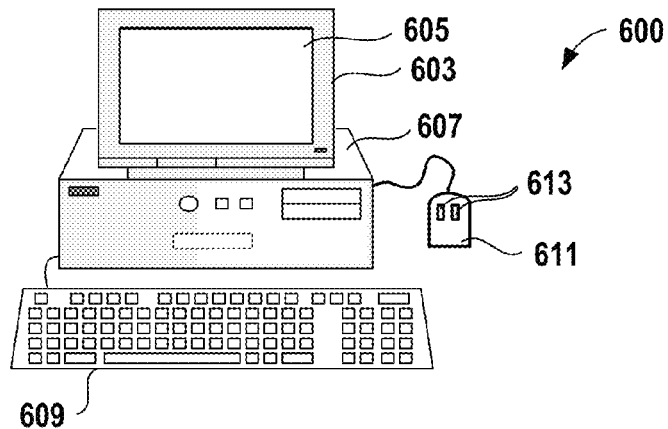
FIG. 5A is a generalized diagram of a typical computer system suitable for use with the present invention.

In FIG. 5A, is an illustration of an embodiment of an exemplary computer system 600 suitable for use with the present invention including display 603 having display screen 605. Cabinet 607 houses standard computer components (not shown) such as a disk drive, CDROM drive, display adapter, network card, random access memory (RAM), central processing unit (CPU), and other components, subsystems and devices. User input devices such as a mouse 611 having buttons 613, and keyboard 609 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g. laptop, palmtop, pentop, server, workstation, mainframe). Any hardware platform suitable for performing the processing described herein is suitable for use with the present invention.

Figure 5B:
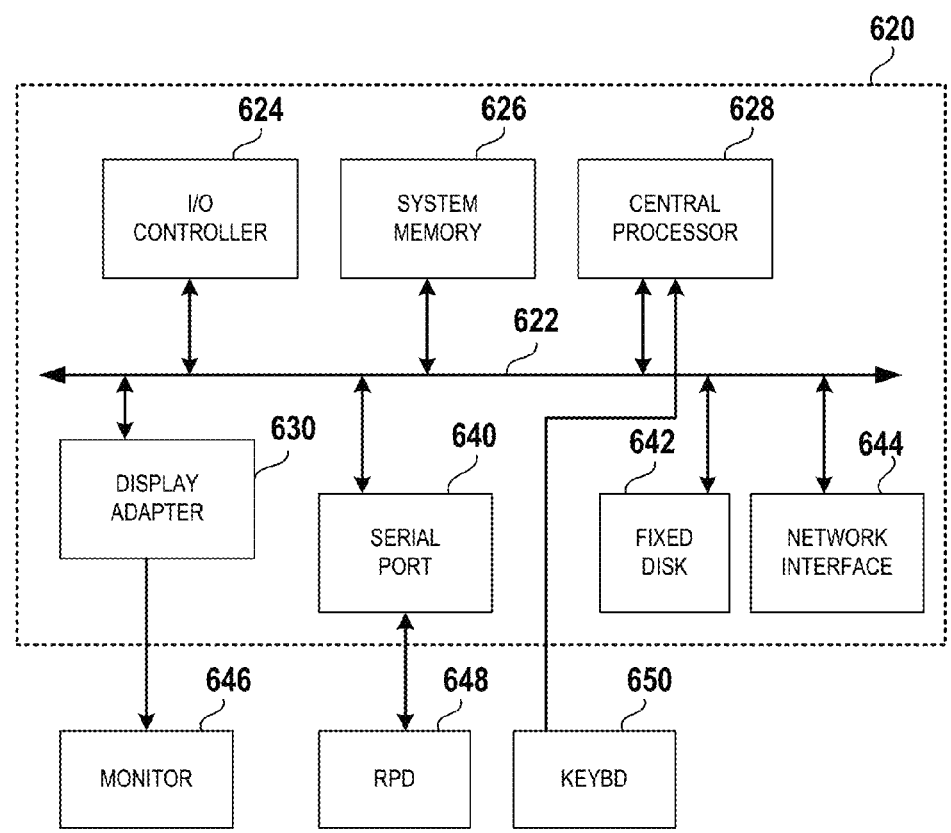
FIG. 5B shows subsystems in the typical computer system of FIG. 6A.
Figure 5C:
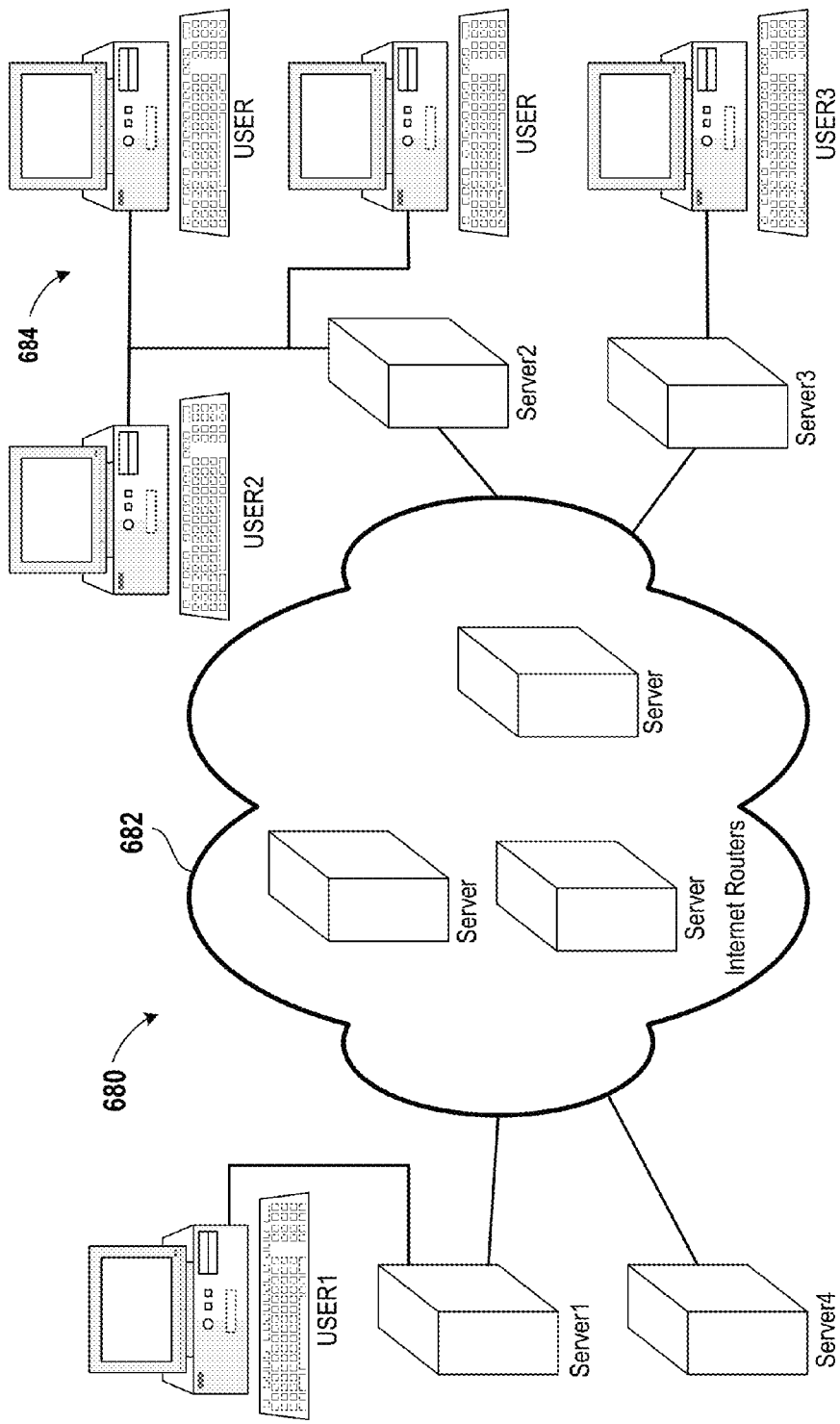
FIG. 5C is a generalized diagram of a typical network suitable for use with the present invention.

FIG. 5B illustrates an exemplary subsystems that might typically be found in a computer such as computer 600. In FIG. 5B, subsystems within box 620 are directly interfaced to internal bus 622. Such subsystems typically are contained within the computer system such as within cabinet 607 of FIG. 5A. Subsystems include input/output (I/O) controller 624, System Random Access Memory (RAM) 626, Central Processing Unit (CPU) 628, Display Adapter 630, Serial Port 640, Fixed Disk 642 and Network Interface Adapter 644. The use of bus 622 allows each of the subsystems to transfer data among the subsystems and, most importantly, with the CPU. External devices can communicate with the CPU or other subsystems via the bus 622 by interfacing with a subsystem on the bus. Monitor 646 connects to the bus through Display Adapter 630. A relative pointing device (RPD) 648 such as a mouse connects through Serial Port 640. Some devices such as a Keyboard 650 can communicate with the CPU by direct means without using the main data bus as, for example, via an interrupt controller and associated registers (not shown).

As with the external physical configuration shown in FIG. 5A, many subsystem configurations are possible. FIG. 5B is illustrative of but one suitable configuration. Subsystems, components or devices other than those shown in FIG. 5B can be added. A suitable computer system can be achieved without using all of the subsystems shown in FIG. 5B. For example, a standalone computer need not be coupled to a network so Network Interface 644 would not be required. Other subsystems such as a CDROM drive, graphics accelerator, etc. can be included in the configuration without affecting the performance of the system of the present invention.

FIG. 5C is a generalized diagram of a typical network. In FIG. 5C, the network system 680 includes several local networks coupled to the Internet. Although specific network protocols, physical layers, topologies, and other network properties are presented herein, embodiments of the present invention are suitable for use with any network.

In FIG. 5C, computer USER1 is connected to Server1. This connection can be by a network such as Ethernet, Asynchronous Transfer Mode, IEEE standard 1553 bus, modem connection, Universal Serial Bus, etc. The communication link need not be wire but can be infrared, radio wave transmission, etc. Server1 is coupled to the Internet. The Internet is shown symbolically as a collection of server routers 682. Note that the use of the Internet for distribution or communication of information is not strictly necessary to practice the present invention but is merely used to illustrate embodiments, above. Further, the use of server computers and the designation of server and client machines are not critical to an implementation of the present invention. USER1 Computer can be connected directly to the Internet. Server1's connection to the Internet is typically by a relatively high bandwidth transmission medium such as a T1 or T3 line.

Similarly, other computers at 684 are shown utilizing a local network at a different location from USER1 computer. The computers at 684 are couple to the Internet via Server2. USER3 and Server3 represent yet a third installation.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine. Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or personal information manager (also referred to as a "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" or "computer-readable media" for purposes of embodiments of the present invention may be any medium/media that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, carrier wave, or computer memory. The computer readable medium may have suitable instructions for synchronously presenting multiple video program ID streams, such as on a display screen, or for providing for input or presenting in accordance with various embodiments of the present invention.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for sharing multimedia content, comprising:
   detecting a secondary device that is paired to a main device, the main device used to render publicly viewable multimedia content, the secondary device configured to access multimedia content provided by one or more content sources over a network and share the multimedia content with the main device, wherein the multimedia content obtained from the one or more content sources are presented in a first portion of a grid rendered on a display screen of the secondary device;
   detecting selection of a multimedia content from the first portion of the grid rendered on the secondary device, the selection causes rendering of the selected multimedia content at the display screen of the secondary device;
   detecting selection of a user from a second portion of the grid during rendering of the selected multimedia content at the secondary device, wherein the second portion of the grid includes icons of users and is accessed with a swipe gesture on the grid, the user selection being detected based on an interaction at an icon identifying the user rendered in the second portion of the grid of the secondary device, wherein the interaction for selecting the icon is a finger gesture, the selection of the icon of the user causing the multimedia content currently rendering at the secondary device to be automatically selected for sharing with the user, the selection of the icon further causing identification of the main device for rendering the selected multimedia content for the selected user; and sharing the selected multimedia content currently rendering on the secondary device with the main device, the sharing causes rendering of the multimedia content on the main device, in accordance to share attributes defined during selection of the user, wherein the main device is actively being used for viewing other multimedia content in a primary window on a display screen of the main device and the sharing causes switching out the other multimedia content from the primary window and rendering of the selected multimedia content in the primary window, wherein the other multimedia content switched out of the primary window is demoted and rendered on a secondary window of the display screen of the main device, wherein operations of the method are performed by at least one processor of a server computer.

2. The method of claim 1, wherein the publicly viewable multimedia content at the main device includes any one or combination of content provided by one or more content providers or content generated and shared by one or more users.

3. The method of claim 1, wherein the share attributes identify public sharing of the multimedia content.

4. The method of claim 1, wherein the selected multimedia content is rendered in a separate secondary window on the display screen of the main device.

5. The method of claim 1, wherein the icon of a user sharing the multimedia content is rendered alongside the selected multimedia content on the main device, during sharing.

6. The method of claim 1, further includes providing an option to un-share the multimedia content shared on the main device, the un-sharing causes removal of the multimedia content from content selected for sharing on the main device.

7. The method of claim 1, further includes receiving selection of auxiliary content for the selected multimedia content, the auxiliary content shared on one of the main devices or select ones of other secondary devices of one or more other users, the sharing of the auxiliary content is based on share attributes defined for the auxiliary content.

8. The method of claim 7, wherein the auxiliary content is retrieved from one or more content sources or is generated at the secondary device.

9. The method of claim 7, wherein the auxiliary content is provided by one or more other users with whom the multimedia content is shared or by a user initiating the sharing of multimedia content.

10. A method for sharing multimedia content, comprising:
detecting a secondary device of a first user that is paired to a main device, the main device used to render publicly viewable multimedia content, the secondary device of the first user configured to access the multimedia content provided by one or more content sources over a network and share the multimedia content with the main device, wherein the multimedia content obtained from the one or more content sources are presented in a first portion of a grid rendered on a display screen of the secondary device;

detecting selection of a second user from a second portion of the grid during rendering of the selected multimedia content on the display screen of the secondary device of the first user, wherein the second portion of the grid includes icons of users and is accessed with a swipe gesture on the grid, wherein the second user is viewing a second multimedia content at a second secondary device associated with the second user, the selection of the second user being detected based on an interaction at an icon identifying the second user rendered in the second portion of the grid on the secondary device of the first user, wherein the interaction selecting the second user is a finger gesture, the selection of the second user providing access to the second multimedia content that is currently being viewed at the second secondary device by the second user, in accordance to share attributes defined for the second multimedia content by the second user; and providing the second multimedia content for rendering on the secondary device of the first user, in response to the interaction at the icon of the second user rendered in the second portion of the grid on the secondary device of the first user, the rendering of the second multimedia content includes automatically switching out the selected multimedia content currently rendering on the secondary device associated with the first user, wherein the selected multimedia content that was switched out is moved to a secondary window and wherein operations of the method are performed by at least one processor of a server computer.

11. The method of claim 10, wherein the share attributes include an icon of the second user.

12. The method of claim 11, further includes updating a user grid at the secondary device of the first user with the icon of the second user sharing the multimedia content.

13. The method of claim 10, further includes,
detecting selection of the icon of a third user at the second portion of the grid rendered on the secondary device of the first user, the third user being associated with a different secondary device or a second main device; and in response to the detection, providing access to a third multimedia content currently rendering on the different secondary device or the second main device associated with the third user, the access causing switching out the multimedia content currently rendering on the display screen of secondary device of the first user with the third multimedia content that is currently being viewed by the third user, the switching being enabled in accordance to the share attributes defined for the third multimedia content defined by the third user, wherein the third multimedia content viewed by the third user is different from the multimedia content that was switched out of the secondary device of the first user, wherein providing access includes allowing interaction at the third multimedia content currently rendering on the secondary device of the first user.

14. A method for sharing multimedia content, comprising:
detecting a secondary device that is paired to a main device and to one or more other secondary devices, the main device used to render publicly viewable multimedia content and the one or more of the other secondary devices used to render content that is defined for private viewing, the secondary device configured to access the multimedia content and the content provided by one or more content sources over a network and share the multimedia content with the main device and the content with the one or more of the other secondary devices associated with other users, wherein the multimedia content obtained from the one or more content sources is presented in a first portion of a grid rendered on a display screen of the secondary device;

detecting selection of a multimedia content from the first portion of the grid rendered on the secondary device, for sharing, the selection causes rendering of the selected multimedia content at a display screen of the secondary device;

receiving the content for sharing with other users, the received content representing auxiliary content that is defined for private viewing;

identifying share attributes for the multimedia content and the share attributes for the auxiliary content selected for sharing, on the secondary device;

detecting selection of one or more of other users and corresponding one or more of the other secondary devices associated with the one or more of the other users from a second portion of the grid for sharing the auxiliary content, wherein the second portion of the grid includes icons of the other users and is accessed with a swipe gesture on the grid, the selection of the one or more of other users being detected based on interactions at icons identifying the respective one or more other users rendered in the second portion of the grid on the secondary device, the selection of the corresponding one or more of the other secondary devices associated with the one or more users being detected based on interactions at options provided alongside the icons of the other users; and presenting the selected multimedia content for rendering in a primary window of a display screen of the main device for public viewing in accordance to the defined share attributes, and providing the auxiliary content to the other secondary devices associated with the selected one or more of the other users for rendering, in accordance to the corresponding share attributes defined for the auxiliary content, so as to allow private viewing of the auxiliary content during current rendering of the selected multimedia content at the main device, wherein the main device is actively being used for viewing other multimedia content in the primary window of the display screen and the presenting includes switching out the other multimedia content from the primary window and rendering of the selected multimedia content in the primary window of the main device, wherein the other multimedia content switched out of the primary window is demoted and rendered on a separate secondary window in the display screen of the main device, wherein method operations are performed by one or more processor of a server computing device.

15. The method of claim 14, further includes presenting the selected multimedia content for rendering on the specific ones of the other secondary devices associated with the selected one or more of the other users in accordance to the share attributes defined for the selected multimedia content, the presenting on the specific ones of the other secondary devices enabling simultaneous viewing of the selected multimedia content with the auxiliary content with the selected one or more of the other users.

16. The method of claim 14, wherein the specific ones of the other secondary devices associated with the selected one or more of the other users are co-located or remotely located from a user initiating the sharing of the multimedia content or the auxiliary content.

17. The method of claim 14, wherein the interactions detected at the respective icons is a tap-and-hold gesture.

18. The method of claim 10, wherein the share attributes include social contact information of the first user selected from one or more social graphs of the second user, the social contact information used in identifying the secondary device of the first user and forwarding the multimedia content to the secondary device of the first user.

* * * * *